US011887540B2

(12) United States Patent
Mi

(10) Patent No.: US 11,887,540 B2
(45) Date of Patent: Jan. 30, 2024

(54) PIXEL CIRCUIT AND DRIVING METHOD THEREOF, AND DISPLAY PANEL

(71) Applicant: HEFEI VISIONOX TECHNOLOGY CO., LTD., Anhui (CN)

(72) Inventor: Lei Mi, Kunshan (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 17/990,070

(22) Filed: Nov. 18, 2022

(65) Prior Publication Data

US 2023/0125275 A1 Apr. 27, 2023

Related U.S. Application Data

(63) Continuation of application No. PCT/CN2021/114926, filed on Aug. 27, 2021.

(30) Foreign Application Priority Data

Nov. 26, 2020 (CN) ......................... 202011354699.3

(51) Int. Cl.
*G09G 3/3233* (2016.01)
*G09G 3/3266* (2016.01)
*G09G 3/3275* (2016.01)

(52) U.S. Cl.
CPC ......... *G09G 3/3233* (2013.01); *G09G 3/3266* (2013.01); *G09G 3/3275* (2013.01);
(Continued)

(58) Field of Classification Search
CPC .. G09G 3/3233; G09G 3/3266; G09G 3/3275; G09G 2300/0819;
(Continued)

(56) References Cited

U.S. PATENT DOCUMENTS

2017/0116918 A1 4/2017 Dong et al.
2017/0243542 A1 8/2017 Xiang et al.
(Continued)

FOREIGN PATENT DOCUMENTS

CN 104465715 A 3/2015
CN 104658484 A 5/2015
(Continued)

OTHER PUBLICATIONS

International Search Report dated Nov. 2, 2021, in corresponding International Application No. PCT/ CN2021/114926, 6 pages.
(Continued)

*Primary Examiner* — Stephen G Sherman
(74) *Attorney, Agent, or Firm* — Maier & Maier, PLLC

(57) ABSTRACT

A pixel circuit, a driving method thereof, and a display panel. The pixel circuit includes a drive module, a first initialization module and a data write module. The drive module is configured to generate, in response to a data signal, a drive current to drive a light-emitting element to emit light. The first initialization module is controlled by a first scan signal and a second scan signal and is configured to initialize a control terminal of the drive module when the first scan signal and the second scan signal are active. The data write module is controlled by a third scan signal, where the first initialization module is configured to cooperate with the data write module to write the data signal into the control terminal of the drive module when the second scan signal and the third scan signal are active.

20 Claims, 9 Drawing Sheets

(52) U.S. Cl.
CPC ............... *G09G 2300/0819* (2013.01); *G09G 2300/0842* (2013.01); *G09G 2300/0861* (2013.01); *G09G 2310/08* (2013.01)

(58) Field of Classification Search
CPC ... G09G 2300/0842; G09G 2300/0861; G09G 2310/08
See application file for complete search history.

(56) References Cited

U.S. PATENT DOCUMENTS

| | | | | |
|---|---|---|---|---|
| 2019/0130842 | A1 | 5/2019 | Jang et al. | |
| 2021/0193049 | A1* | 6/2021 | Lin | G09G 3/3266 |

FOREIGN PATENT DOCUMENTS

| | | | |
|---|---|---|---|
| CN | 107799535 | A | 3/2018 |
| CN | 108877674 | A | 11/2018 |
| CN | 109461407 | A | 3/2019 |
| CN | 109559686 | A | 4/2019 |
| CN | 110148384 | A | 8/2019 |
| CN | 209843218 | U | 12/2019 |
| CN | 111243522 | A | 6/2020 |
| CN | 111383596 | A | 7/2020 |
| CN | 111710300 | A | 9/2020 |
| CN | 111754920 | A | 10/2020 |
| CN | 111986612 | A | 11/2020 |
| CN | 112509517 | A | 3/2021 |
| CN | 113097247 | A | 7/2021 |
| IN | 110033737 | A | 7/2019 |
| KR | 20160129987 | A | 11/2016 |
| KR | 20180011434 | A | 2/2018 |
| KR | 20180032722 | A | 4/2018 |

OTHER PUBLICATIONS

Office Action dated Dec. 23, 2021, in related Chinese Patent Application No. 202011354699.3, 17 pages.
Office Action dated Mar. 16, 2022, in related Chinese Patent Application No. 202011354699.3, 18 pages.

* cited by examiner

PIXEL CIRCUIT AND DRIVING METHOD THEREOF, AND DISPLAY PANEL

CROSS-REFERENCE TO RELATED APPLICATION

This is a Continuation Application of International Patent Application No. PCT/CN2021/114926, filed Aug. 27, 2021, which claims priority to Chinese Patent Application No. 202011354699.3 filed Nov. 26, 2020, the disclosures of which are incorporated herein by reference in their entireties.

TECHNICAL FIELD

Embodiments of the present application relate to the field of display technologies, and for example, a pixel circuit, a driving method thereof, and a display panel.

BACKGROUND

With the continuous development of display technologies, the application range of a display panel is becoming increasingly wider, and people have increasingly higher requirements for the display panel.

A pixel circuit in the display panel plays a very important role in driving a light-emitting element to stably emit light. The pixel circuit is configured to drive the light-emitting element to emit light under the control of a scan signal and a light emission control signal, and the scan signal and the light emission control signal are provided by a gate driver in panel (GIP) located in a non-display region of the display panel. However, a structure of a GIP circuit that needs to be provided correspondingly for the pixel circuit is complicated, resulting in a large border of the display panel.

SUMMARY

Embodiments of the present application provide a pixel circuit, a driving method thereof, and a display panel, to simplify a structure of a GIP circuit and reduce a border of the display panel.

The embodiments of the present application provide following technical schemes.

The present application provides a pixel circuit. The pixel circuit includes a drive module, a first initialization module and a data write module. The drive module is configured to generate, in response to a data signal, a drive current to drive a light-emitting element to emit light. The first initialization module is controlled by a first scan signal and a second scan signal and is configured to initialize a control terminal of the drive module when the first scan signal and the second scan signal are active. The data write module is controlled by a third scan signal, where the first initialization module is configured to cooperate with the data write module to write the data signal into the control terminal of the drive module when the second scan signal and the third scan signal are active.

The present application further provides a display panel. The display panel includes multiple pixel circuits described in any of the embodiments of the present application.

The present application further provides a driving method of a pixel circuit. The driving method is applicable to the pixel circuit described in any of the embodiments of the present application.

The driving method includes: an initialization stage in which the first scan signal and the second scan signal are active to control the first initialization module to initialize a control terminal of the drive module; a data write stage in which the second scan signal and the third scan signal are active to control the first initialization module to cooperate with the data write module to write a data signal into the control terminal of the drive module; and a light emission stage in which the drive module generates, in response to the data signal, a drive current to drive a light-emitting element to emit light.

According to the embodiments of the present application, the first initialization module of the pixel circuit is controlled by the first scan signal and the second scan signal, and the data write module is controlled by the third scan signal, so that a threshold voltage compensation is implemented while data is written, and in a driving process of the pixel circuit, the first scan signal, the second scan signal and the third scan signal have a same waveform shape and a same delay time interval. Thus, scan signals in a current stage may multiplex scan signals in previous stages, for example, a scan signal in a current stage is the third scan signal, a scan signal in a previous stage is the second scan signal, and a scan signal in previous two stages is the first scan signal, so that the second scan signal may multiplex a scan signal in a previous stage, and the third scan signal may multiplex scan signals in previous two stages. In this way, for the pixel circuit of the embodiments of the present application, the scan signals may be output by only one group of GIP circuits, which is conducive to simplifying the structure of the GIP circuit. In view of the above, the embodiments of the present application are conducive to simplifying a providing manner of the scan signals on the basis of implementing the threshold voltage compensation, thereby facilitating simplification of the structure of the GIP circuit and reducing a width of the border of the display panel.

DETAILED DESCRIPTION

The present application will be described in detail in conjunction with the accompanying drawings and embodiments below.

Figure 1:
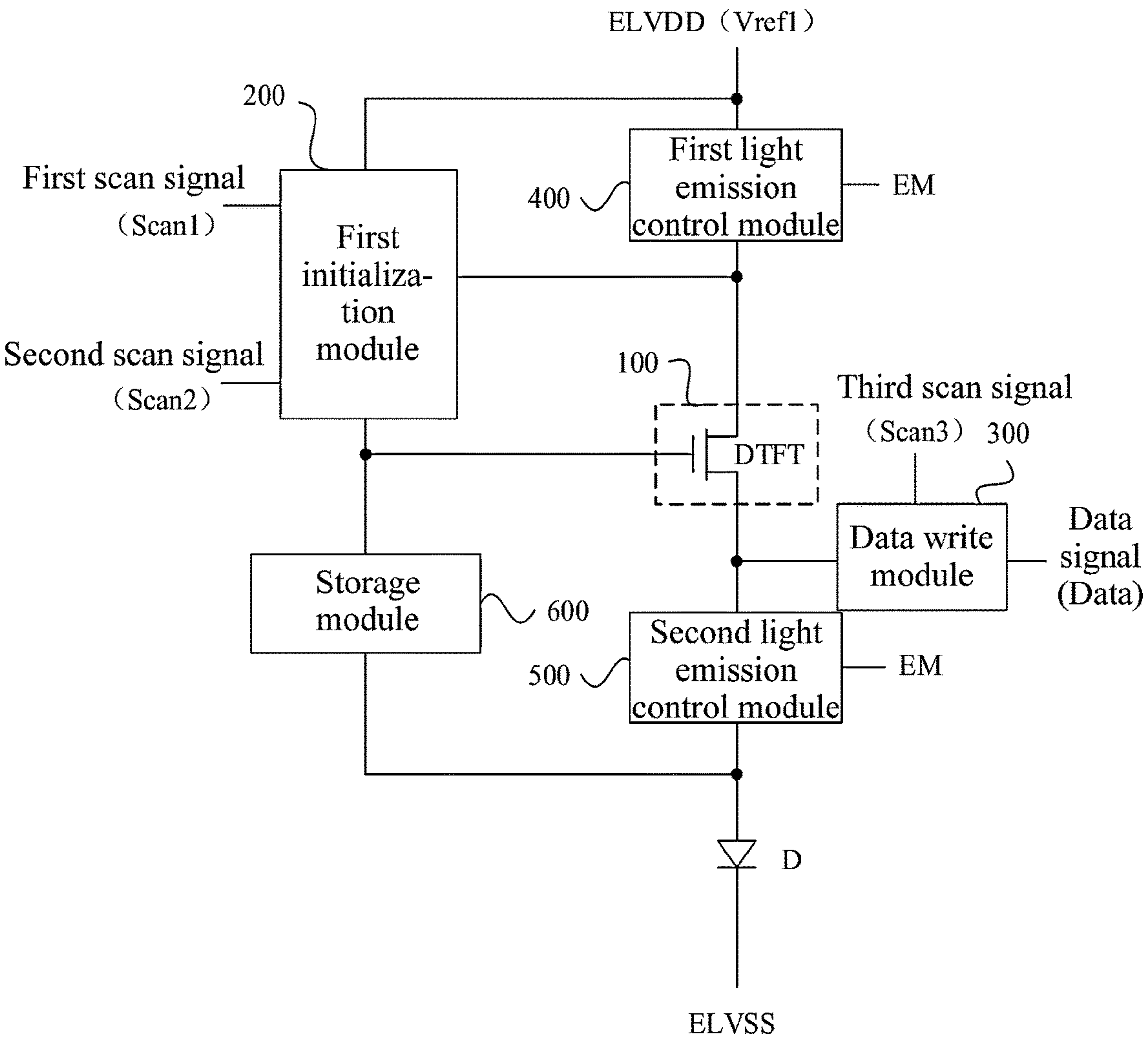
FIG. 1 is a schematic structural diagram of a pixel circuit according to an embodiment of the present application.

An embodiment of the present application provides a pixel circuit, and the pixel circuit may be appliable to an N-type Metal-Oxide-Semiconductor (NMOS) pixel circuit structure. Referring to FIG. 1, the pixel circuit includes a drive module 100, a first initialization module 200 and a data write module 300. The drive module 100 is configured to generate, in response to a data signal, a drive current to drive a light-emitting element D to emit light. The first initialization module 200 is connected to a first scan signal Scan1 and a second scan signal Scan2. The first initialization module 200 is configured to initialize a control terminal of the drive module 100 when the first scan signal Scan1 and the second scan signal Scan2 are active. The data write module 300 is connected to a third scan signal Scan3. The first initialization module 200 is configured to cooperate with the data write module 300 to write the data signal into the control terminal of the drive module 100 when the second scan signal Scan2 and the third scan signal Scan3 are active.

The drive module 100, the first initialization module 200 and the data write module 300 are each constituted by a transistor, and whether the first scan signal Scan1, the second scan signal Scan2 and the third scan signal Scan3 are active is related to a type of the transistor. When a transistor to which the scan signal is connected is an N-type transistor, the scan signal is active at a high level. When the transistor to which the scan signal is connected is a P-type transistor, the scan signal is active at a low level. A signal initializing the control terminal of the drive module 100 is a first initialization signal Vref1.

The drive module 100 includes the control terminal, a first terminal and a second terminal. The first initialization module 200 includes a first control terminal, a second control terminal, an initialization signal input terminal, a data signal input terminal, and an output terminal. The first control terminal of the first initialization module 200 receives the first scan signal Scan1, the second control terminal of the first initialization module 200 receives the second scan signal Scan2, the initialization signal input terminal receives the first initialization signal Vref1, the data signal input terminal is electrically connected to the first terminal of the drive module 100, and the output terminal is electrically connected to the control terminal of the drive module 100. The data write module 300 includes a control terminal, an input terminal and an output terminal, where the control terminal of the data write module 300 receives the third scan signal Scan3, the input terminal of the data write module 300 receives the data signal Data, and the output terminal of the data write module 300 is electrically connected to the second terminal of the drive module 100.

Figure 2:
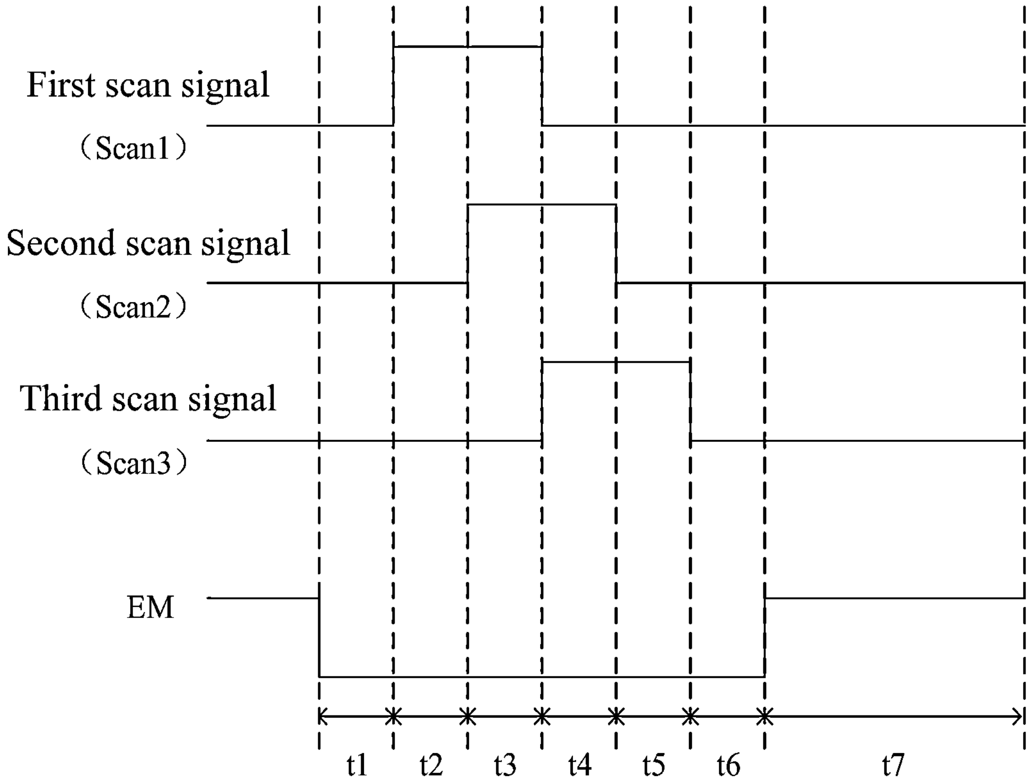
FIG. 2 is a schematic diagram of a driving timing of a pixel circuit according to an embodiment of the present application.

Referring to FIG. 2, transistors in the drive module 100, the first initialization module 200 and the data write module 300 are all N-type transistors. An operation process of the pixel circuit includes a first stage t1, a second stage t2, a third stage t3 (a second initialization stage), a fourth stage t4 (a data write stage), a fifth stage t5, a sixth stage t6, and a seventh stage t7 (a light emission stage). Only the third stage t3 (the second initialization stage), the fourth stage t4 (the data write stage) and the seventh stage t7 (the light emission stage) will be described below.

In the third stage t3 (the second initialization stage), the first scan signal Scan1 and the second scan signal Scan2 are each at a high level, the initialization signal input terminal and the output terminal of the first initialization module 200 are controlled to be turned on, and thus the first initialization signal Vref1 is controlled to be written into the control terminal of the drive module 100, so that an initialization of the control terminal of the drive module 100 is implemented, and the drive module 100 is in an on state at an initial moment of the fourth stage t4.

In the fourth stage t4 (the data write stage), the first scan signal Scan1 is at a low level, the second scan signal Scan2 and the third scan signal Scan3 are each at a high level, and the second scan signal Scan2 controls the data signal input terminal and the output terminal of the first initialization module 200 to be turned on, whereby the first terminal and the control terminal of the drive module 100 are controlled to be on. The third scan signal Scan3 controls the input terminal and the output terminal of the data write module 300 to be turned on, whereby the data signal is controlled to be written into the second terminal of the drive module 100. Since the drive module 100 is in the on state, the data signal is written into the control terminal of the drive module 100 sequentially through the second terminal of the drive module 100, the first terminal of the drive module 100, the data input terminal of the first initialization module 200, and the output terminal of the first initialization module 200, and the drive module 100 is turned off until a potential of the control terminal of the drive module 100 reaches at Vdata+Vth, where Vdata is a data voltage, and Vth is a threshold voltage of the drive module 100. In a subsequent calculation of the drive current, a threshold voltage Vth is subtracted so that the finally obtained drive current is not affected by the threshold voltage of the drive module 100, whereby the threshold voltage compensation is implemented. Therefore, the first initialization module 200 cooperates with the data write module 300 to write the data signal into the control terminal of the drive module 100, so that the threshold voltage compensation is implemented.

In the seventh stage t7 (the light emission stage), the first scan signal Scan1, the second scan signal Scan2 and the third scan signal Scan3 are each at a low level, the first terminal of the drive module 100 receives a first power supply signal ELVDD, the second terminal of the drive module 100 is connected to an anode of the light-emitting element D, a cathode of the light-emitting element D receives a second power supply signal ELVSS, and the drive module 100 generates, in response to the data signal of the control terminal thereof, the drive current to drive the light-emitting element D to emit light.

As such, in the embodiments of the present application, the first initialization module 200 of the pixel circuit is controlled by the first scan signal Scan1 and the second scan signal Scan2, and the data write module 300 is controlled by the third scan signal Scan3, so that the threshold voltage compensation is implemented while the data signal is written into the drive module 100, and in a driving process of the pixel circuit, the first scan signal Scan1, the second scan signal Scan2 and the third scan signal Scan3 have a same waveform shape and a same delay time interval. Thus, scan signals in a current stage may multiplex scan signals in previous stages, for example, a scan signal at a current stage is the third scan signal Scan3, a scan signal in a previous stage is the second scan signal Scan2, and a scan signal in a previous two stages is the first scan signal Scan1, so that the second scan signal Scan2 may multiplex a scan signal in a previous stage, and the third scan signal Scan1 may multiplex scan signals in previous two stages. In this way, for the pixel circuit of the embodiments of the present application, the scan signals can be output by only one group of GIP circuits, which is conducive to simplifying the structure of the GIP circuit. In view of the above, the embodiments of the present application are conducive to simplifying a providing manner of the scan signals on the basis of implementing the threshold voltage compensation, thereby facilitating simplifying the structure of the GIP circuit and reducing a width of the border of the display panel.

Referring to FIG. 1, in an implementation of the present application, the drive module 100 includes a drive transistor DTFT, a gate of the drive transistor DTFT is used as the control terminal of the drive module 100, a source of the drive transistor DTFT is used as the second terminal of the drive module 100, and a drain of the drive transistor DTFT is used as the first terminal of the drive module 100. The drive transistor DTFT is an N-type transistor, and the first power supply signal ELVDD is multiplexed as the first initialization signal Vref1. The N-type transistor is turned on when its gate is at a high level, and correspondingly, the first initialization signal Vref1 should be set to be at a high level. Since the first power supply signal ELVDD is at a high level, the first power supply signal ELVDD may be multiplexed as the first initialization signal Vref1. In this way, the first initialization signal Vref1 may be omitted, thereby facilitating simplification of the structure of the driver circuit and simplification of the design of a signal trace.

Referring to FIGS. 1 and 2, the pixel circuit further includes a first light emission control module 400 and a second light emission control module 500. A control terminal of the first light emission control module 400 receives a light emission control signal EM, a first terminal of the first light emission control module 400 receives the first power supply signal ELVDD, and a second terminal of the first light emission control module 400 is electrically connected to the first terminal of the drive module 100. A control terminal of the second light emission control module 500 receives the light emission control signal EM, a first terminal of the second light emission control module 500 is electrically connected to the second terminal of the drive module 100, and a second terminal of the second light emission control module 500 is electrically connected to the light-emitting element D.

In the seventh stage t7 (the light emission stage) of the pixel circuit, the first scan signal Scan1, the second scan signal Scan2 and the third scan signal Scan3 are each at a low level, and the light emission control signal EM is at a high level. The light emission control signal EM controls the first terminal and the second terminal of the first light emission control module 400 to be turned on, the first power supply signal ELVDD is written into the first terminal of the drive module 100 through the first light emission control module 400, and the light emission control signal EM controls the first terminal and the second terminal of the second light emission control module 500 to be turned on so that the second terminal of the drive module 100 and the anode of the light-emitting element D are turned on. The cathode of the light-emitting element D receives the second power supply signal ELVSS, and the drive module 100 generates, in response to the data signal of the control terminal thereof, the drive current to drive the light-emitting element D to emit light.

As such, the first light emission control module 400 and the second light emission control module 500 of the pixel circuit provided in the embodiments of the present application are controlled by a same light emission control signal EM. However, for a general pixel circuit, if the first power supply signal ELVDD being multiplexed as the first initialization signal Vref1 is to be achieved, then the first light emission control module 400 needs to be turned on in the second initialization stage, while the second light emission control module 500 cannot be turned on; therefore, the control logic of the pixel circuit described above is complicated, and the first light emission control module 400 and the second light emission control module 500 need to be controlled by using different light emission control signals EM. Correspondingly, two sets of GIP circuits that output light emission control signals are needed.

For the structure of the pixel circuit provided in the embodiments of the present application, it is not necessary to set the first light emission control module 400 to be turned on in the second initialization stage to make the first light emission control module 400 and the second light emission control module 500 be turned on and off at the same time. The control logic for initializing the control terminal of the drive module 100 in the embodiments of the present application is simple, and only one set of GIP circuit for outputting the light emission control signal is required. Therefore, the embodiments of the present application only need one set of GIP circuit for outputting the light emission control signal EM on the basis of only one set of GIP circuit for outputting the scan signals, so that the structure of the GIP circuit is simplified, which is conducive to simplifying the border of the display panel.

Referring to FIG. 1, the pixel circuit further includes a storage module 600, a first terminal of the storage module 600 is electrically connected to the control terminal of the drive module 100, a second terminal of the storage module 600 is electrically connected to the light-emitting element D, and the storage module 600 is configured to store a potential of the control terminal of the drive module 100, so as to enable the drive module 100 to generate a stable drive current in the light emission stage.

Figure 3:
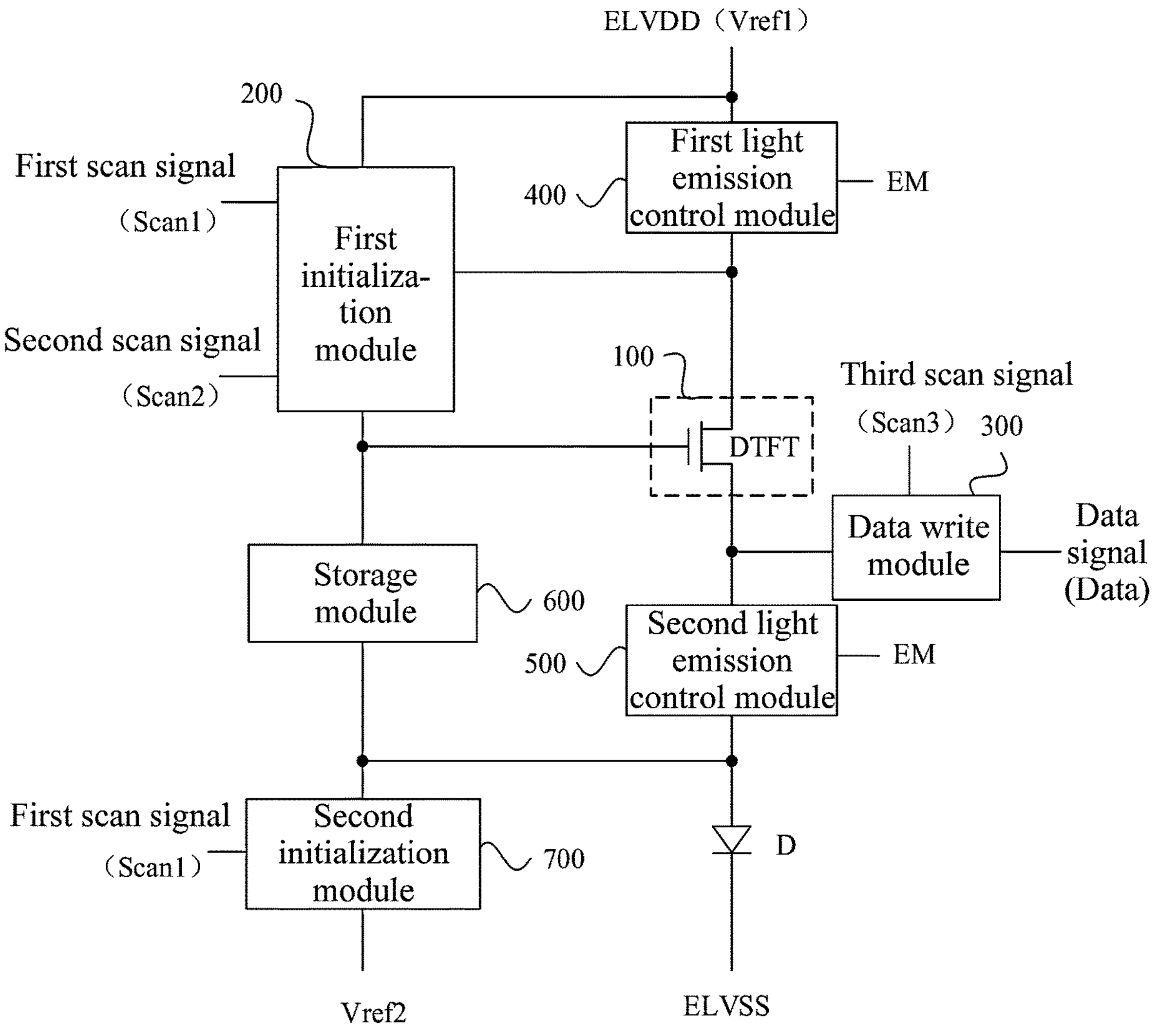
FIG. 3 is a schematic structural diagram of another pixel circuit according to an embodiment of the present application.

Referring to FIG. 3, the pixel circuit further includes a second initialization module 700, a control terminal of the second initialization module 700 receives the first scan signal Scan1, a first terminal of the second initialization module 700 receives the second initialization signal Vref2, and a second terminal of the second initialization module 700 is electrically connected to the light-emitting element D. Similar to the first initialization signal Vref1, the second initialization signal Vref2 is a direct current reset signal.

With reference to FIGS. 2 and 3, in the second stage t2 (the first initialization stage) in a driving process of the pixel circuit, the first scan signal Scan1 in a high-level stage controls the first terminal and the second terminal of the second initialization module 700 to be turned on, and the second initialization signal Vref2 is written into the anode of the light-emitting element D through the second initialization module 700. A potential of the anode of the light-emitting element D is maintained at a potential of the second initialization signal Vref2 under the action of the memory module 600.

In the seventh stage t7 (the light emission stage), the first terminal and the second terminal of the second light emission control module 500 are turned on, and the second initialization signal Vref2 is written into the second terminal of the drive module 100. A magnitude of the drive current is determined by following formula:

$$I=1/2*\mu*Cox*W/L*(Vgs-Vth)^2=1/2*\mu*Cox*W/L*(V\text{data}-V\text{ref2})^2$$

Where μ is a mobility of the drive transistor DTFT, Cox is a parasitic capacitor Cst of the drive transistor DTFT, W/L is a width-to-length ratio of the drive transistor DTFT, and Vgs is a voltage difference between a gate and a source of the drive transistor DTFT.

As such, based on the structure of the pixel circuit provided in the embodiments of the present application, the second initialization module 700 may be configured to be controlled by the first scan signal. The second initialization module 700 in the embodiments of the present application initializes the second terminal of the drive module 100 while initializing the anode of the light-emitting element D, which is advantageous for improving the accuracy of the drive current and improving the display quality of the display panel.

Figure 4:
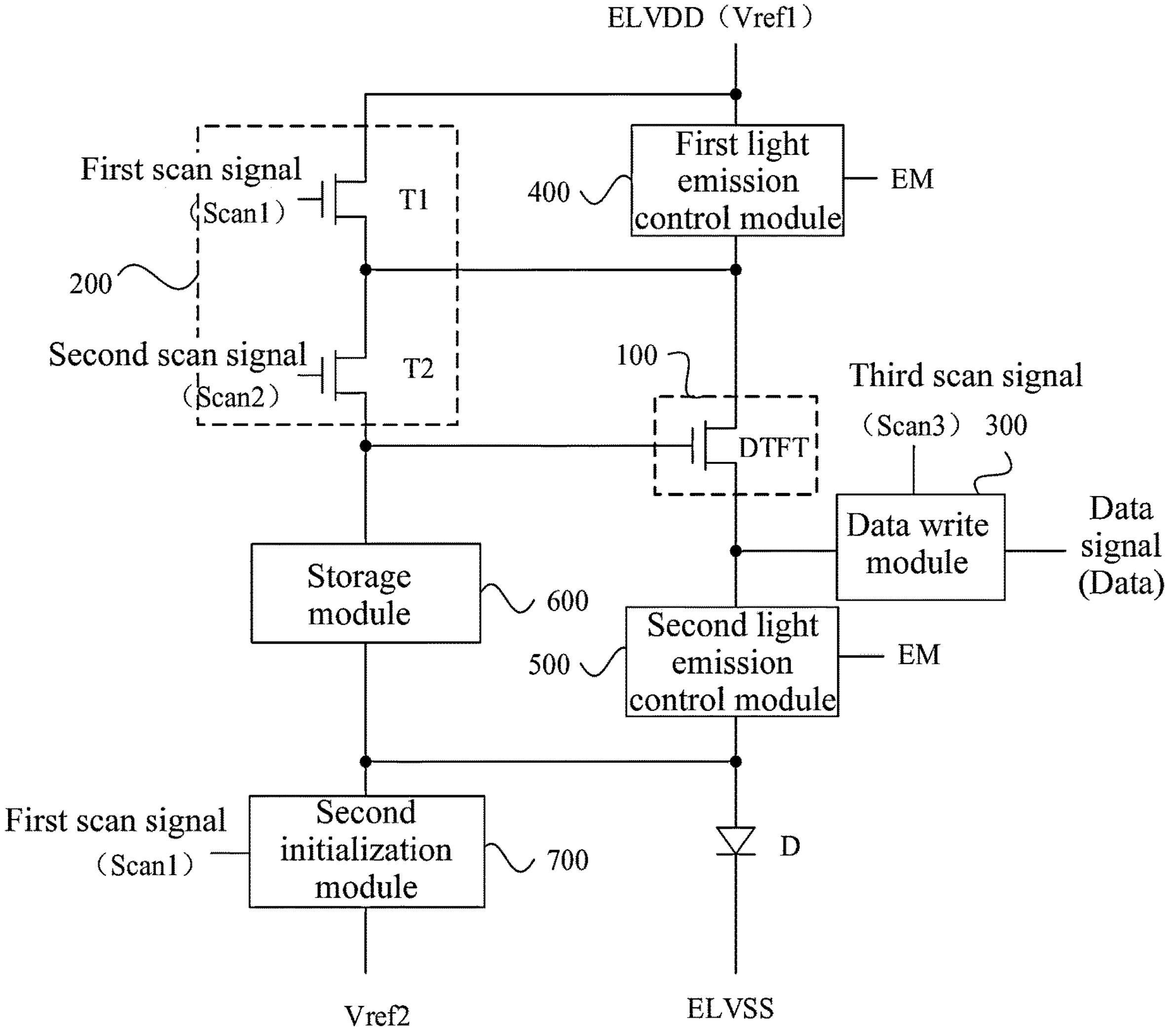
FIG. 4 is a schematic structural diagram of another pixel circuit according to an embodiment of the present application.

Referring to FIG. 4, the first initialization module 200 includes a first transistor T1 and a second transistor T2. A gate of the first transistor T1 receives the first scan signal Scan1, and a first electrode of the first transistor T1 receives the first initialization signal Vref1. A gate of the second transistor T2 receives the second scan signal Scan2, a first electrode of the second transistor T2 is electrically connected to a second electrode of the first transistor T1, and a second electrode of the second transistor T2 is electrically connected to the control terminal of the drive module 100.

The first transistor T1 and the second transistor T2 are both N-type transistors, and when the first scan signal Scan1 and the second scan signal Scan2 are each at a high level, the first transistor T1 and the second transistor T2 are turned on and the first initialization signal Vref1 is written into the gate of the drive transistor DTFT.

According to the embodiments of the present application, the first initialization module 200 includes the first transistor T1 and the second transistor T2, which achieves the function of initializing the gate of the drive transistor DTFT by the first initialization module 200. The first initialization module 200 includes only two transistors, so that the circuit structure is simple and easy to implement.

The first transistor T1 is a low-temperature polysilicon transistor or an oxide transistor, and the second transistor T2 is an oxide transistor. The Oxide transistor has better leakage current protection than the low-temperature polysilicon transistor, so that a leakage current of the gate of the drive transistor DTFT is reduced and the display stability is improved. Exemplarily, both the first transistor T1 and the second transistor T2 are oxide transistors, so that the leakage of the gate of the drive transistor DTFT passing through the second transistor T2 and the first transistor T1 is reduced. Alternatively, the first transistor T1 is a low-temperature polysilicon transistor and the second transistor T2 is an oxide transistor, and since the first transistor T1 and the second transistor T2 are connected in series, a leakage current on the entire branch is smaller when a leakage current on the second transistor T2 is smaller, thereby reducing the leakage of the gate of the drive transistor DTFT.

Figure 5:
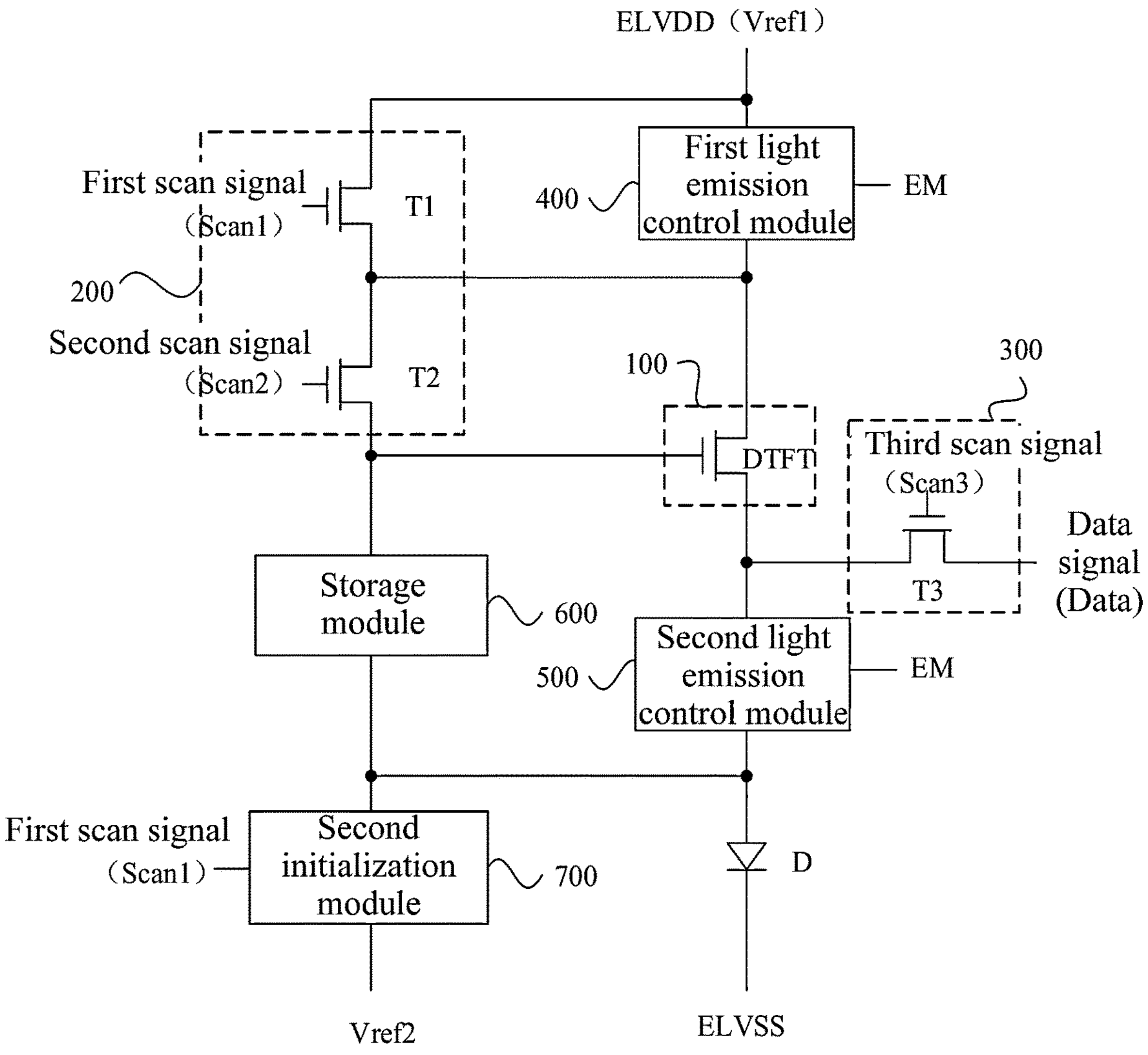
FIG. 5 is a schematic structural diagram of another pixel circuit according to an embodiment of the present application.

Referring to FIG. 5, the first electrode of the second transistor T2 is further electrically connected to the first terminal of the drive module 100. The data write module 300 includes a third transistor T3, a gate of the third transistor T3 receives the third scan signal Scan3, a first electrode of the third transistor T3 receives the data signal Data, and a second electrode of the third transistor T3 is electrically connected to the second terminal of the drive module 100.

When the first scan signal Scan1 is at a low level, and the second scan signal Scan2 and the third scan signal Scan3 are each at a high level, the first scan signal Scan1 controls the first transistor T1 to be turned off, the second scan signal Scan2 controls the second transistor T2 to be turned on, and the third scan signal Scan3 controls the third transistor T3 to be turned on. The data signal Data is written into the gate of the drive transistor DTFT through the third transistor T3, the source of the drive transistor DTFT, the drain of the drive transistor DTFT, and the second transistor T2.

According to the embodiments of the present application, the first initialization module 200 includes the first transistor T1 and the second transistor T2, so that the function of writing the data signal into the gate of the drive transistor DTFT is implemented through the first initialization module 200 in cooperation with the data write module 300 on the basis of implementing the function of initializing the gate of the drive transistor DTFT by the first initialization module 200. In addition, the first initialization module 200 includes only two transistors, so that the circuit structure is simple and easy to implement.

Figure 6:
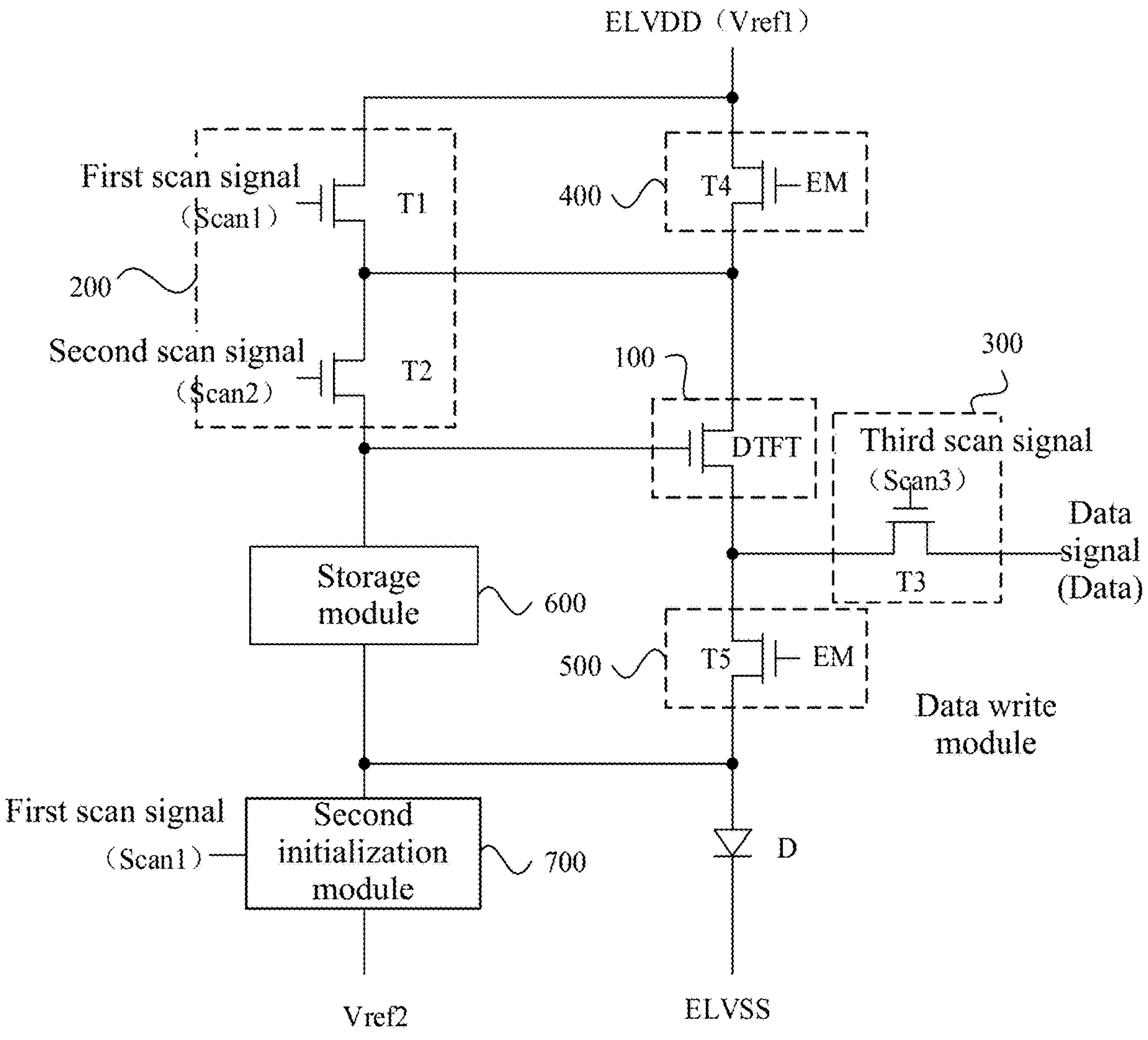
FIG. 6 is a schematic structural diagram of another pixel circuit according to an embodiment of the present application.

Referring to FIG. 6, the first light emission control module 400 includes a fourth transistor T4.

A gate of the fourth transistor T4 receives the light emission control signal EM, a first electrode of the fourth transistor T4 receives the first power supply signal ELVDD, and a second electrode of the fourth transistor T4 is electrically connected to the drain of the drive transistor DTFT. The second light emission control module 500 includes a fifth transistor T5, a gate of the fifth transistor T5 receives the light emission control signal EM, a first electrode of the fifth transistor T5 is electrically connected to the source of the drive transistor DTFT, and a second electrode of the fifth transistor T5 is electrically connected to the light-emitting element D.

The fourth transistor T4 and the fifth transistor T5 are both N-type transistors. When the light emission control signal EM is at a low level, the light emission control signal EM controls the fourth transistor T4 and the fifth transistor T5 to be turned off, and the pixel circuit enters the initialization stage (including the first initialization stage and the second initialization stage) and the data write stage. When the light emission control signal is at a high level, the pixel circuit enters the light emission stage, the light emission control signal EM controls the fourth transistor T4 and the fifth transistor T5 to be turned on, the first power supply signal ELVDD is written into the drain of the drive transistor DTFT through the fourth transistor T4, and a drive current flows into the light-emitting element D through the fifth transistor T5 so that the light-emitting element D emits light.

According to the embodiments of the present application, the first light emission control module 400 includes the fourth transistor T4, and the second light emission control module 500 includes the fifth transistor T5, so that the circuit structure is simple and easy to implement.

Figure 7:
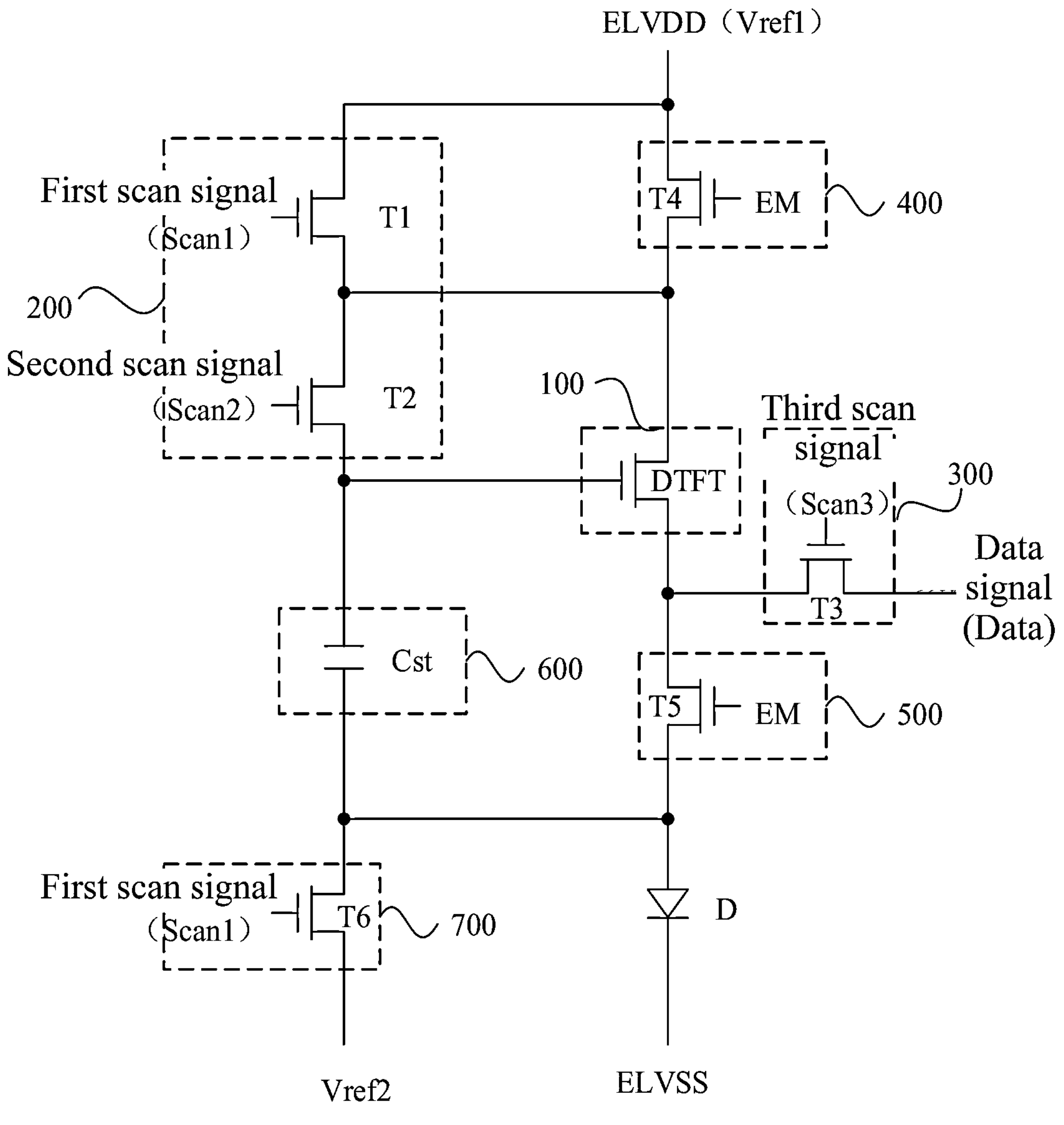
FIG. 7 is a schematic structural diagram of another pixel circuit according to an embodiment of the present application.

Referring to FIG. 7, the second initialization module 700 includes a sixth transistor T6. A gate of the sixth transistor T6 receives the first scan signal Scan1, a first electrode of the sixth transistor T6 receives the second initialization signal Vref2, and a second electrode of the sixth transistor T6 is electrically connected the an anode of the light-emitting element D. The storage module 600 includes a capacitor Cst, a first terminal of the capacitor Cst is electrically connected to the gate of the drive transistor DTFT, and a second terminal of the capacitor Cst is electrically connected to the second electrode of the sixth transistor T6.

The sixth transistor T6 is an N-type transistor. When the first scan signal Scan1 is at a high level, the sixth transistor T6 is controlled to be turned on, the second initialization signal Vref2 is written into the anode of the light-emitting element D, and the anode of the light-emitting element D is initialized, and meanwhile, the second initialization signal Vref2 is written into the second terminal of the capacitor Cst, and the capacitor Cst stores a second initialization potential.

According to the embodiments of the present application, the storage module 600 includes the capacitor Cst, and the second initialization module 700 includes the sixth transistor T6, so that the circuit structure is simple and easy to implement.

Referring to FIG. 7, the pixel circuit includes a drive module 100, a first initialization module 200, a data write module 300, a first light emission control module 400, a second light emission control module 500, a storage module 600, and a second initialization module 700. The drive module 100 includes a drive transistor DTFT, the first initialization module 200 includes a first transistor T1 and a second transistor T2, the data write module 300 includes a third transistor T3, the first light emission control module 400 includes a fourth transistor T4, the second light emission control module 500 includes a fifth transistor T5, the storage module 600 includes a capacitor Cst, and the second initialization module 700 includes a sixth transistor T6. Control signals of the pixel circuit include a first scan signal Scan1, a second scan signal Scan2, a third scan signal Scan3, a light emission control signal EM, a second initialization signal Vref2, a first power supply signal ELVDD, and a second power supply signal ELVSS.

The second initialization signal Vref2 is a direct current reset signal, and the first power supply signal ELVDD and the second power supply signal ELVSS are direct current power supply signals to supply current necessary for the light-emitting element D to emit light. The light-emitting element D is an organic light-emitting diode (OLED). The pixel circuit has a circuit configuration of 7 thin-film transistors and 1 capacitor (7T1C), the drive transistor DTFT, the first transistor T1, the second transistor T2, the third transistor T3, the fourth transistor T4, the fifth transistor T5 and the sixth transistor T6 are all N-type transistors, and the second transistor T2 is the oxide transistor to reduce a leakage current of the gate of the drive transistor DTFT, and remaining transistors are low-temperature polysilicon transistors.

Multiple transistors and the capacitor Cst are connected in such a manner that the gate of the drive transistor DTFT and the anode of the light-emitting element D are respectively connected to two ends of the capacitor Cst. The third transistor T3 is controlled by the third scan signal Scan3 to write the data signal into the source of the drive transistor DTFT. Both the fourth transistor T4 and the fifth transistor T5 are controlled by the light emission control signal EM and jointly determines whether the light-emitting element D emits light. The sixth transistor T6 is controlled by the first scan signal Scan1 and resets the anode of the light-emitting element D to the potential of the second initialization signal Vref2. The second transistor T2 is controlled by the second scan signal Scan2, the first electrode of the second transistor T2 is connected to the drain of the drive transistor DTFT, and the second electrode of the second transistor T2 is connected to the gate of the drive transistor DTFT. The first transistor T1 is controlled by the first scan signal Scan1, and the first transistor T1 and the second transistor T2 act together to reset the gate of the drive transistor DTFT to the potential of the first power supply signal ELVDD.

With reference to FIG. 7 and FIG. 2, in the first stage t1, the first scan signal Scan1, the second scan signal Scan2 and the third scan signal Scan3 are each at a low level, the light emission control signal EM changes from a high level to a low level, the fourth transistor T4 and the fifth transistor T5 are turned off, the light-emitting element D finishes emitting light, and the pixel circuit enters a preparation stage before data writing.

In the second stage t2 (the first initialization stage), the second scan signal Scan2, the third scan signal Scan3 and the light emission control signal EM are each at a low level, the first scan signal Scan1 changes from a low level to a high level, the sixth transistor T6 and the first transistor T1 are turned on, the second initialization signal Vref2 is written into the anode of the light-emitting element D through the sixth transistor T6, and the anode of the light-emitting element D is reset to the potential of the second initialization signal Vref2.

In the third stage t3 (the second initialization stage), the first scan signal Scan1 remains at a high level, the third scan signal Scan3 and the light emission control signal EM remain at a low level, the second scan signal Scan2 changes from a low level to a high level, the second transistor T2 is turned on, the first transistor T1 and the second transistor T2 act together to reset the gate of the drive transistor DTFT to the potential of the first power supply signal ELVDD, so as to ensure that the drive transistor DTFT is in the on state at the beginning of the next stage. Meanwhile, the second initialization signal Vref2 is still written into the anode of the light-emitting element D through the sixth transistor T6.

In the fourth stage t4 (the data write stage), the light emission control signal EM is maintained at a low level, the first scan signal Scan1 changes from a high level to a low level, and the first transistor T1 and the sixth transistor T6 are turned off. The second scan signal Scan2 is maintained at a high level and the second transistor T2 is maintained to be on, and the source and the drain of the drive transistor DTFT are short-circuited. The third scan signal Scan3 changes from a low level to a high level, and the third transistor T3 is turned on. Since the drive transistor DTFT is in the on state, the third transistor T3 and the second transistor T2 act together to discharge a potential of the gate of the drive transistor DTFT from a potential of the first power supply signal ELVDD to Vdata+Vth, and the drive transistor DTFT changes from on to off.

In the fifth stage t5, the first scan signal Scan1 and the light emission control signal EM are maintained at a low level, the second scan signal Scan2 changes from a high level to a low level, and the second transistor T2 is turned off. The third scan signal Scan3 is maintained at a high level, the third transistor T3 is maintained to be on, and a potential of the source of the drive transistor DTFT is a potential of the data signal Data.

In the sixth stage t6, the first scan signal Scan1, the second scan signal Scan2 and the light emission control signal EM are maintained at a low level, the third scan signal Scan3 changes from a high level to a low level, and the third transistor T3 is off.

In the seventh stage t7 (the light emission stage), the first scan signal Scan1, the second scan signal Scan2 and the third scan signal Scan3 are maintained at a low level. The light emission control signal EM changes from a low level to a high level, the fourth transistor T4 and the fifth transistor T5 are turned on, and the light-emitting element D enters the light emission stage. A magnitude of the drive current is determined by following formula.

$$I=1/2*\mu*Cox*W/L*(Vgs-Vth)^2=1/2*\mu*Cox*W/L*(V\text{data}-V\text{ref2})^2$$

Where μ is a mobility of the drive transistor DTFT, Cox is a parasitic capacitor Cst of the drive transistor DTFT, W/L is a width-to-length ratio of the drive transistor DTFT, and Vgs is a voltage difference between a gate and a source of the drive transistor DTFT. Since a gate voltage of the drive transistor DTFT is Vdata+Vth, in a process of calculating the drive current, a threshold voltage Vth is subtracted so that the finally obtained drive current is not affected by the threshold voltage of the drive module 100, whereby the threshold voltage compensation is implemented. In addition, since a source voltage of the drive transistor DTFT is initialized to a potential of the second initialization voltage in a first initialization stage, instead of being directly calculated by using the second power supply signal ELVSS, a calculation error caused by a voltage drop (IR drop) on the second power supply signal ELVSS is avoided, and the stability of the source voltage of the drive transistor DTFT and the accuracy of the calculation of the drive current are maintained.

The embodiments of the present application are advantageous for simplifying the structure of a GIP circuit and thereby reducing the border of the display panel. Analyses are as follows.

In one aspect, in a driving process of the pixel circuit, the first scan signal Scan1, the second scan signal Scan2 and the third scan signal Scan3 have a same waveform shape and a same delay time interval. Thus, scan signals in a current stage may multiplex scan signals in previous stages, for example, a scan signal in a current stage is the third scan signal Scan3, a scan signal in a previous stage is the second scan signal Scan2, and a scan signal in previous two stages is the first scan signal Scan1, so that the second scan signal Scan2 may multiplex a scan signal in a previous stage, and the third scan signal Scan1 may multiplex scan signal in previous two stages. Thus, for the pixel circuit of the embodiments of the present application, the scan signals may be output by only one group of GIP circuits.

On the other hand, the control logic of pixel circuit is generally complicated, and the first light emission control module 400 and the second light emission control module 500 need to be controlled by using different light emission control signals EM. Correspondingly, two sets of GIP circuits for outputting the light emission control signal EM are required. In the embodiments of the present application, the control logic for initializing the control terminal of the drive module 100 is simple, and only one set of GIP circuit for outputting the light emission control signal EM is required.

In view of the above, an embodiment of the present application provides an entirely new pixel circuit with all NMOSs and 7T1C, which is advantageous not only to simplify the structure of the GIP circuit, to reduce the border of the display panel, but also to achieve the threshold voltage compensation, to avoid calculation errors due to an IR drop of the second power supply signal ELVSS, and to reduce a gate leakage current of the drive transistor DTFT.

Figure 8:
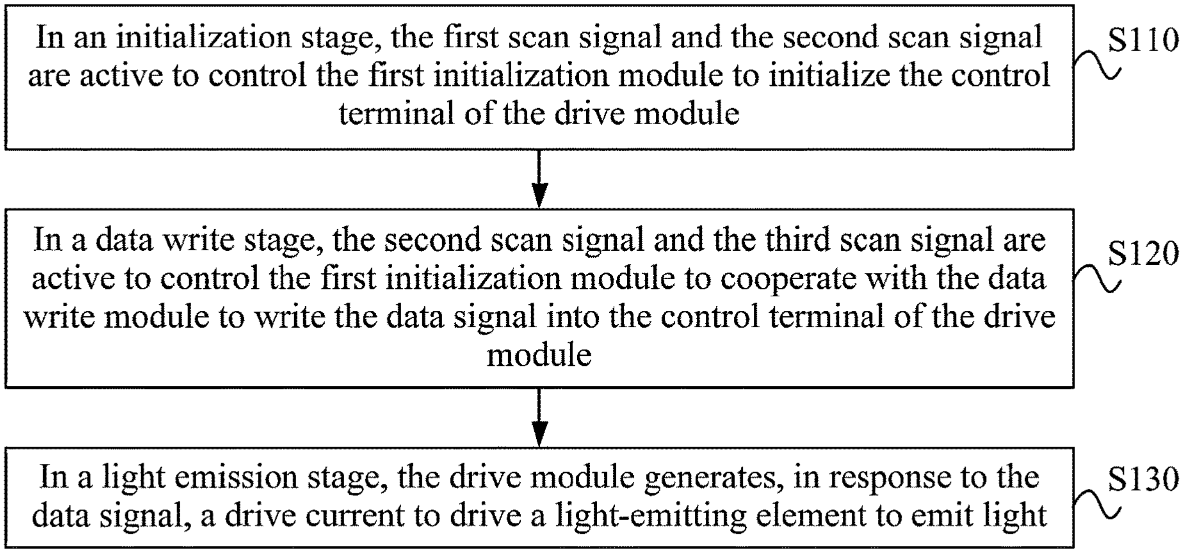
FIG. 8 is a flowchart of a driving method of a pixel circuit according to an embodiment of the present application.

An embodiment of the present application further provides a driving method for a pixel circuit, the driving method is appliable to the pixel circuit provided in any of the embodiments of the present application. Referring to FIG. 8, the driving method includes steps described below.

In S110, in an initialization stage, the first scan signal and the second scan signal are active to control the first initialization module to initialize the control terminal of the drive module.

In S120, in a data write stage, the second scan signal and the third scan signal are active to control the first initialization module to cooperate with the data write module to write the data signal into the control terminal of the drive module.

In S130, in a light emission stage, the drive module generates, in response to the data signal, a drive current to drive a light-emitting element to emit light.

According to the embodiments of the present application, in a driving process of the pixel circuit, the first scan signal, the second scan signal and the third scan signal have a same waveform shape and a same delay time interval. Thus, scan signals in a current stage may multiplex scan signals in previous stages, for example, a scan signal in a current stage is the third scan signal, a scan signal in a previous stage is the second scan signal, and a scan signal in previous two stages is the first scan signal, so that the second scan signal may multiplex a scan signal in a previous stage, and the third scan signal may multiplex scan signals in previous two stages. In this way, for the pixel circuit of the embodiments of the present application, the scan signals may be output by only one group of GIP circuits, which is conducive to simplifying the structure of the GIP circuit.

An embodiment of the present application further provides a display panel including multiple pixel circuits as provided in any of the embodiments of the present application, its technical principle is similar and will not be repeated here.

Figure 9:
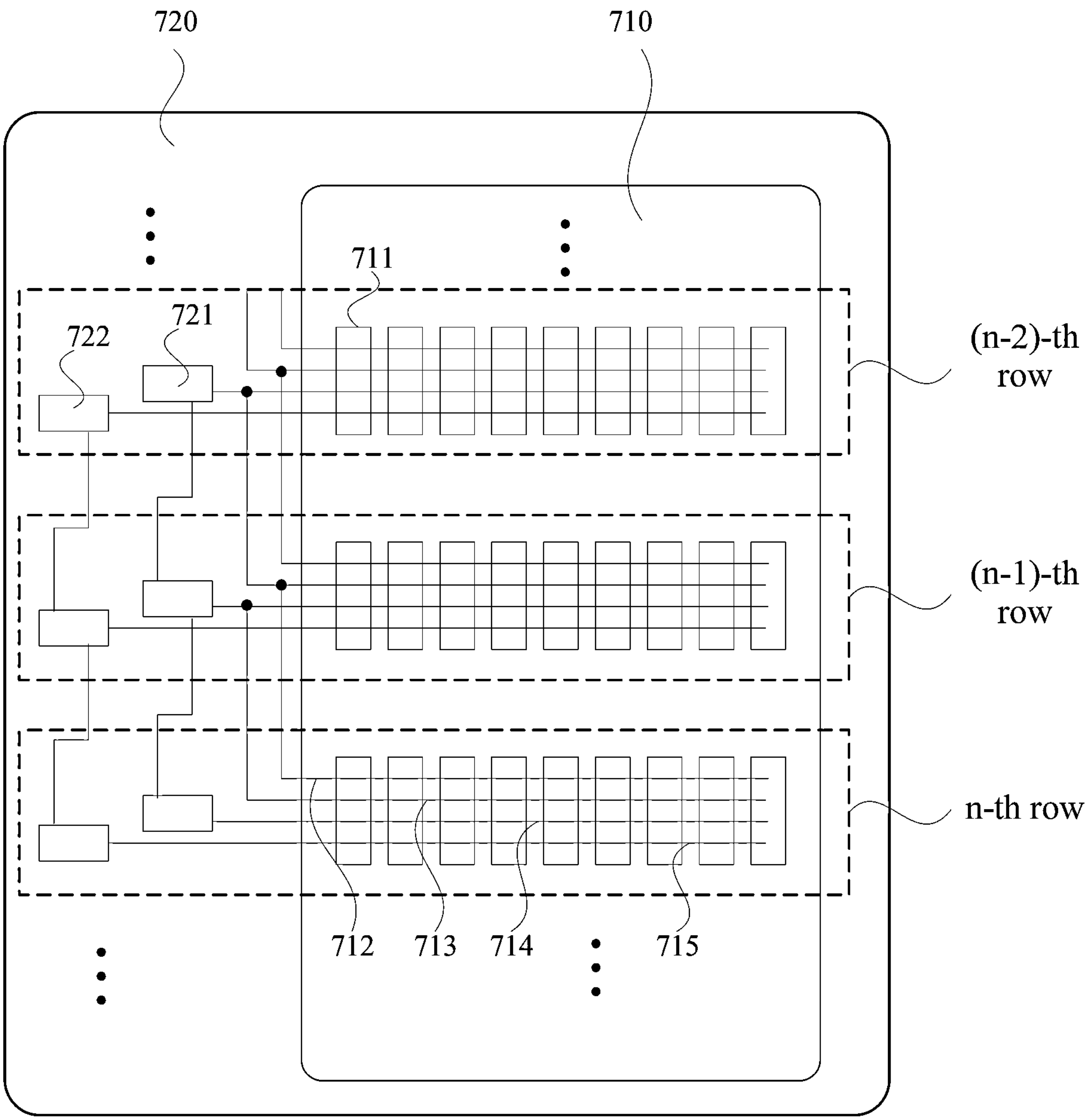
FIG. 9 is a schematic structural diagram of a display panel according to an embodiment of the present application.

Referring to FIG. 9, the display panel includes a display region 710 and a non-display region 720. The display panel further includes multiple pixel circuits 711 and multiple scan driver circuits 721. Multiple pixel circuits 711 located within the display region 710 are arranged in an array, and multiple scan driver circuits 721 located within the non-display region 720 are connected in cascade.

A scan signal output by a scan driver circuit 721 in an n-th stage is used as a third scan signal of pixel circuits 711 in an n-th row; a scan signal output by a scan driver circuit 721 in a (n−1)-th stage is used serves as a second scan signal of the pixel circuits 711 the n-th row; and a scan signal output by a scan driver circuit 721 in a (n−2)-th stage is used as a first scan signal of the pixel circuits 711 in the n-th row; where n is a positive integer, and n≥3.

That is, a third scan signal line 714 of the pixel circuits 711 in the n-th row is electrically connected to the scan driver circuit 721 in the n-th stage, a second scan signal line 713 of the pixel circuits 711 in the n-th row is electrically connected to the scan driver circuit 721 in the (n−1)-th stage, and a first scan signal line 712 of the pixel circuits 711 in the n-th row is electrically connected to the scan driver circuit 721 in the (n−2)-th stage.

According to the embodiments of the present application, one set of GIP circuits for outputting scan signals is used for the first scan signal, the second scan signal and the third scan signal.

It should be noted that the pixel circuits 711 in a third row and below the third row may multiplex the scan driver circuits 721 in the upper row and the upper two rows, and the pixel circuits 711 in the first row and the second row need to be provided with two additional stages of scan driver circuits 721. Therefore, the scan driver circuits 721 on the display panel have at least two more stages than the number of rows of the pixel circuits 711.

Referring to FIG. 9, in an implementation of the present application, optionally, the display panel further includes light emission driver circuits 722 connected in cascade, where the light emission driver circuits 722 are disposed in the non-display region 720 of the display panel. A light emission control signal output by a light emission driver circuit 722 in an n-th stage is used as a light emission control signal of pixel circuits 711 in an n-th row. That is, the light emission control signal line 715 in the pixel circuits 711 in the n-th row is electrically connected to the light emission driver circuit 722 in the n-th stage. In this way, according to the embodiments of the present application, it can be achieved that one set of GIP circuits for outputting the light emission control signal is used.

What is claimed is:

1. A pixel circuit, comprising:

a drive module further comprising a drive transistor, configured to generate, in response to a data signal, a drive current to drive a light-emitting element to emit light;

a first initialization module further comprising a first transistor and a second transistor, controlled by a first scan signal and a second scan signal and is configured to initialize a control terminal of the drive module when the first scan signal and the second scan signal are active; and a data write module further comprising a third transistor, controlled by a third scan signal, wherein the first initialization module is configured to cooperate with the data write module to write the data signal into the control terminal of the drive module when the second scan signal and the third scan signal are active;

wherein the first scan signal, the second scan signal and the third scan signal have a same waveform shape and a same delay time interval, and scan signals of the pixel circuit multiplex scan signals of previous pixel circuits.

2. The pixel circuit of claim 1, wherein a gate of the first transistor is configured to receive the first scan signal, and a first electrode of the first transistor is configured to receive a first initialization signal; and wherein a gate of the second transistor is configured to receive the second scan signal, a first electrode of the second transistor is electrically connected to a second electrode of the first transistor, and a second electrode of the second transistor is electrically connected to the control terminal of the drive module.

3. The pixel circuit of claim 2, wherein the first transistor is a low-temperature polysilicon transistor or an oxide transistor, and the second transistor is an oxide transistor.

4. The pixel circuit of claim 2, wherein the first electrode of the second transistor is further electrically connected to a first terminal of the drive module; and wherein a gate of the third transistor is configured to receive the third scan signal, a first electrode of the third transistor is configured to receive the data signal, and a second electrode of the third transistor is electrically connected to a second terminal of the drive module.

5. The pixel circuit of claim 1, further comprising:

a first light emission control module further comprising a fourth transistor, wherein a control terminal of the first light emission control module is configured to receive a light emission control signal, a first terminal of the first light emission control module is configured to receive a first power supply signal, and a second terminal of the first light emission control module is electrically connected to a first terminal of the drive module; and a second light emission control module further comprising a fifth transistor, wherein a control terminal of the second light emission control module is configured to receive the light emission control signal, a first terminal of the second light emission control module is electrically connected to a second terminal of the drive module, and a second terminal of the second light emission control module is electrically connected to the light-emitting element.

6. The pixel circuit of claim 5, wherein the drive transistor is an N-type transistor, and the first power supply signal is multiplexed as a first initialization signal.

7. The pixel circuit of claim 6, wherein a gate of the drive transistor is used as the control terminal of the drive module, a source of the drive transistor is used as the second terminal of the drive module, and a drain of the drive transistor is used as the first terminal of the drive module.

8. The pixel circuit of claim 6, wherein a gate of the fourth transistor is configured to receive the light emission control signal, a first electrode of the fourth transistor is configured to receive the first power supply signal, and a second electrode of the fourth transistor is electrically connected to a drain of the drive transistor; and wherein a gate of the fifth transistor is configured to receive the light emission control signal, a first electrode of the fifth transistor is electrically connected to a source of the drive transistor, and a second electrode of the fifth transistor is electrically connected to the light-emitting element.

9. The pixel circuit of claim 5, wherein the first power supply signal is a direct current power supply signal.

10. The pixel circuit of claim 5, wherein an effective-level stage of the first scan signal overlaps with an effective-level stage of the second scan signal;

the effective-level stage of the second scan signal overlaps with an effective-level stage of the third scan signal; and an effective-level stage of the light emission control signal does not overlap with the effective-level stage of the first scan signal, the effective-level stage of the second scan signal, and the effective-level stage of the third scan signal.

11. The pixel circuit of claim 1, further comprising:

a storage module, wherein a first terminal of the storage module is electrically connected to the control terminal of the drive module, and a second terminal of the storage module is electrically connected to the light-emitting element; and a second initialization module further comprising at least a sixth transistor, wherein a control terminal of the second initialization module is configured to receive the first scan signal, a first terminal of the second initialization module is configured to receive a second initialization signal, and a second terminal of the second initialization module is electrically connected to the light-emitting element.

12. The pixel circuit of claim 11, wherein the storage module is configured to store a potential of the control terminal of the drive module, to enable the drive module to generate a stable drive current in a light emission stage.

13. The pixel circuit of claim 11, wherein the second initialization signal is a direct current reset signal.

14. The pixel circuit of claim 11, a gate of the sixth transistor is configured to receive the first scan signal, a first electrode of the sixth transistor is configured to receive the second initialization signal, and a second electrode of the sixth transistor is electrically connected to an anode of the light-emitting element; and wherein the storage module comprises a capacitor, a first terminal of the capacitor is electrically connected to a gate of the drive transistor, and a second terminal of the capacitor is electrically connected to the second electrode of the sixth transistor.

15. The pixel circuit of claim 1, wherein the drive module comprises the control terminal, a first terminal and a second terminal, and the first initialization module comprises a first control terminal, a second control terminal, an initialization signal input terminal, a data signal input terminal, and an output terminal, wherein the first control terminal of the first initialization module is configured to receive the first scan signal, the second control terminal of the first initialization module is configured to receive the second scan signal, the initialization signal input terminal is configured to receive a first initialization signal, the data signal input terminal is electrically connected to the first terminal of the drive module, and the output terminal of the first initialization module is electrically connected to the control terminal of the drive module; and wherein the data write module comprises a control terminal, an input terminal and an output terminal, wherein the control terminal of the data write module is configured to receive the third scan signal, the input terminal of the data write module is configured to receive the data signal, and the output terminal of the data write module is electrically connected to the second terminal of the drive module.

16. A display panel, comprising a plurality of pixel circuits according to claim 1.

17. The display panel of claim 16, further comprising: a plurality of scan driver circuits connected in cascade, wherein the plurality of pixel circuits are arranged in an array;

wherein a scan signal output by a scan drive circuit in an n-th stage among the plurality of scan driver circuits is used as a third scan signal of pixel circuits in an n-th row among the plurality of pixel circuits;

wherein a scan signal output by a scan driver circuit in a (n−1)-th stage among the plurality of scan driver circuits is used as a second scan signal of the pixel circuits in the n-th row among the plurality of pixel circuits; and wherein a scan signal output by a scan driver circuit in a (n−2)-th stage among the plurality of scan driver circuits is used as a first scan signal of the pixel circuits in the n-th row among the plurality of pixel circuits;

wherein n is a positive integer, and n≥3.

18. The display panel of claim 16, further comprising: a display region, a non-display region, and a plurality of scan driver circuits, wherein a plurality of pixel circuits located within the display region are arranged in an array, and a plurality of scan driver circuits located within the non-display region are connected in cascade.

19. The display panel of claim 18, further comprising:

a plurality of light emission driver circuits connected in cascade, wherein the plurality of light emission driver circuits are disposed in the non-display region of the display panel, a light emission control signal output by a light emission driver circuit in an n-th stage among the plurality of light emission driver circuits is used as a light emission control signal of pixel circuits in an n-th row among the plurality of pixel circuits, wherein n is a positive integer.

20. A driving method of a pixel circuit, wherein the pixel circuit comprises a drive module, a first initialization module and a data write module; the first initialization module is controlled by a first scan signal and a second scan signal, and the data write module is controlled by a third scan signal; and wherein the driving method comprises:

an initialization stage in which the first scan signal and the second scan signal are active to control the first initialization module to initialize a control terminal of the drive module;

a data write stage in which the second scan signal and the third scan signal are active to control the first initialization module to cooperate with the data write module to write a data signal into the control terminal of the drive module; and a light emission stage in which the drive module generates, in response to the data signal, a drive current to drive a light-emitting element to emit light;

wherein the first scan signal, the second scan signal and the third scan signal have a same waveform shape and a same delay time interval, and scan signals of the pixel circuit multiplex scan signals of previous pixel circuits.

* * * * *